United States Patent [19]
Swanstrom et al.

[11] Patent Number: 5,948,093
[45] Date of Patent: Sep. 7, 1999

[54] MICROPROCESSOR INCLUDING AN INTERRUPT POLLING UNIT CONFIGURED TO POLL EXTERNAL DEVICES FOR INTERRUPTS WHEN SAID MICROPROCESSOR IS IN A TASK SWITCH STATE

[75] Inventors: Scott E. Swanstrom; David S. Christie, both of Austin; Steven L. Belt, Pflugerville, all of Tex.

[73] Assignee: Advanced Micro Devices, Inc., Sunnyvale, Calif.

[21] Appl. No.: 08/599,618

[22] Filed: Feb. 9, 1996

[51] Int. Cl.[6] .................................................. G06F 9/22
[52] U.S. Cl. .................... 710/267; 395/670; 710/264; 710/269; 710/50
[58] Field of Search ...................... 395/733, 734, 395/739, 740, 741, 742, 866, 867, 868, 869, 870

[56] References Cited

U.S. PATENT DOCUMENTS

| | | | |
|---|---|---|---|
| 5,095,526 | 3/1992 | Baum | 395/733 |
| 5,363,506 | 11/1994 | Fukuoka | 395/733 |
| 5,428,794 | 6/1995 | Williams | 395/733 |
| 5,437,039 | 7/1995 | Yuen | 395/733 |
| 5,495,615 | 2/1996 | Nizar et al. | 395/733 |
| 5,535,397 | 7/1996 | Durante et al. | 395/740 |
| 5,555,420 | 9/1996 | Sarangdhar et al. | 395/739 |
| 5,568,649 | 10/1996 | MacDonald et al. | 395/868 |
| 5,594,905 | 1/1997 | Mital | 395/733 |
| 5,613,126 | 3/1997 | Schmidt | 395/733 |

OTHER PUBLICATIONS

Intel Corp., "MultiProcessor Specification", Version 1.1, Apr., 1994, p. 1.1–Glossary 2.

Hummel, "PC Magazine Programmer's Technical Reference: The Processor and Coprocessor", 1992, pp. 153–182.

Intel Corp., "Microprocessor & Peripheral Handbook–vol. I Microprocessor", 1989, pp. 2–259 through 2–277.

Singh et al., "16–Bit and 32–Bit Microprocessors Architecture, Software, and Interfacing Techniques", 1991, pp. 302–305.

*Primary Examiner*—Jack B. Harvey
*Assistant Examiner*—Raymond N Phan
*Attorney, Agent, or Firm*—Conley, Rose & Tayon, PC; B. Noel Kivlin

[57] ABSTRACT

An interrupt polling unit included within a bus interface unit of a microprocessor is provided. The interrupt polling unit causes an interrupt acknowledge bus transaction to occur. If an interrupt controller receiving the interrupt acknowledge bus transaction returns an interrupt vector indicative of an interrupt service routine, then the microprocessor executes the interrupt service routine. The number of interrupt acknowledge bus transactions associated with the interrupt is reduced from two to one. In one embodiment, the interrupt polling unit causes an interrupt acknowledge bus transaction to occur when the microprocessor is performing a task switch. The task switch may be performed by hardware included within the microprocessor or, alternatively, by software executing upon the microprocessor.

23 Claims, 5 Drawing Sheets

MICROPROCESSOR INCLUDING AN INTERRUPT POLLING UNIT CONFIGURED TO POLL EXTERNAL DEVICES FOR INTERRUPTS WHEN SAID MICROPROCESSOR IS IN A TASK SWITCH STATE

BACKGROUND OF THE INVENTION

1. Field of the Invention

This invention is related to computer systems and, more particularly, to interrupt handling mechanisms within computer systems.

2. Description of the Relevant Art

Modern computer systems and the software which runs thereon demand a high performance interrupt structure in order to operate efficiently. Interrupts are used to switch between tasks, and so a multi-tasking operating system benefits from a high performance interrupt structure. A "multi-tasking" operating system is configured to run multiple programs concurrently. Additionally, interrupts provide a means for an electronic device external to the microprocessor to request attention from the operating system. Modern day computer systems are including increasing numbers of these electronic devices, prompting the need for a high performance interrupt structure.

Interrupts cause a microprocessor within the computer system to suspend execution of a task and to execute a specific software routine (referred to as an interrupt service routine) comprising a set of instructions. The interrupt is typically unrelated to the instructions being executed by the microprocessor at the time the interrupt occurs. Instead, the interrupt is caused by an external device requiring software attention. For example, a buffer within an input/output device may fill with data to be transferred to another device or to memory. Many other sources for interrupts are well-known to the skilled artisan.

The instructions being executed by the microprocessor at the time the interrupt occurs are referred to herein as a "task". A task may be a portion of a program, an operating system routine, or even another interrupt service routine.

Because the interrupt is normally unrelated to the task being performed by the microprocessor and is asynchronous to the task itself, the interrupt service routine is executed in such a way that the task may be resumed. In order to resume the task, the "context" within which the task is executing is saved to memory. The context includes register values associated with the task when the task is interrupted. Additionally, the context may include the values within any memory locations that may be accessible to the task. The register portion of the context is saved to memory, and the memory locations are saved by causing the current values stored therein to be visible to the computer system. For example, memory locations are saved if stored into a data cache and the data cache is maintained coherent with main memory. After saving the context, the interrupt service routine is executed. Upon completion of the interrupt service routine, the context is restored to the microprocessor and the task is resumed. Since the restored context is identical to the context when the task was interrupted, the task executes normally. In other words, the interrupt had no effect on the result of executing the task. Instead, only the time required to execute the task is affected.

The x86 architecture defines the context of 32 bit microprocessors to be 68 bytes. Additionally, when the segment registers (which are part of the context in the x86 architecture) are reloaded, segment reloads are initiated to translate the segments. More bytes are transferred when the reload occurs, and clock cycles are required to translate the extra bytes into a format for storing within the microprocessor.

Unfortunately, storing a large number of bytes to memory (as a context save entails) often requires a relatively large number of clock cycles. A clock cycle refers to the amount of time required by portions of the microprocessor to perform their functions. The results of each function are stored in a storage location (e.g. a register or memory) according to a clock signal defining the clock cycle and may be used by another function in the next clock cycle. The bus used by a microprocessor to communicate with other electrical devices may operate according to a different clock cycle than the microprocessor itself. The clock cycle associated with the bus is often referred to as the bus clock cycle.

If the context is saved by the microprocessor when an interrupt is recognized by the microprocessor, the interrupt is being handled via a "task switch". Task switches may also be used to switch between tasks which are not interrupt service routines. When handled via a task switch, the interrupt service routine is isolated from the interrupted task such that any modifications the interrupt service routine performs to the microprocessor's context information may not affect the operation of the task when resumed. The context is restored prior to resuming the task.

Often, an interrupt service routine will only require access to a few registers within the register set to perform its function. In this case, a full context save is not necessary since some registers will not be modified by the interrupt service routine. Instead, only those storage locations which must be changed in order to fetch the instructions within the interrupt service routine need be saved prior to beginning execution of the interrupt service routine. For example, in the x86 architecture the EIP register and CS segment register (which define the address and segment of the instructions to be fetched and executed) and the flags register (which is modified by many of the x86 instructions) are saved. These values are pushed onto the stack defined by the x86 architecture, when the task switch method of interrupt handling is not being used.

When the task switch method of interrupt handling is not in use, an interrupt service routine saves the values stored within registers which it employs to carry out its intended function. Often, the values are stored on the stack. This method of interrupt handling is referred to as an interrupt gate or trap gate in the x86 architecture, depending on whether or not the interrupt service routine may itself be interrupted. If the interrupt service routine does not use all of the microprocessor's context, then clock cycles may be saved with respect to performing the full context save of a task switch. The interrupt service routine is entered and exited more rapidly since context save and restore is not performed. Unfortunately, at least a few registers may still be stored.

Since there are multiple sources of interrupts, the computer system provides a mechanism for identifying one of multiple interrupt service routines. The computer system thus provides flexibility to the programmer in that a particular interrupt service routine may be tailored to the needs of a particular device. If no such mechanism were provided, all interrupts would fetch an interrupt service routine from the same address in memory. A relatively complicated routine stored at the address would need to be written to perform the handling of all types of interrupts from all electronic devices. As used herein, the term "fetching" refers to transferring the contents of a memory location to a destination.

One method for providing the address of the interrupt service routine for a given interrupt is for the microprocessor to request an interrupt vector from another electronic device in the system. An "interrupt vector" is a number which is indicative of a particular interrupt service routine. In the x86 microprocessor, for example, the interrupt vector is an index into an interrupt descriptor table which provides information identifying the address of the associated interrupt service routine.

In many computer systems, the interrupt vector is provided via a dedicated bus transaction. A "bus transaction" is a transfer of information across a bus. Bus transactions may include address and data information as well as the type of transfer. Bus transactions may be address-only, in which an address and related control information are broadcast; data-only, in which data and related control information are broadcast; or address-data in which both address and data are involved. As referred to herein, a bus transaction dedicated for interrupt processing is an interrupt acknowledge bus transaction. Typically, an interrupt acknowledge bus transaction is performed by the microprocessor to acknowledge the existence of an interrupt condition and then a second interrupt acknowledge bus transaction is performed to collect the interrupt vector. Unfortunately, many clock cycles are used to perform the two interrupt acknowledge bus transactions. Until the interrupt vector is known, the computer system may not begin fetching the interrupt service routine (since the interrupt service routine's address is not known). It would be desirable to collect the interrupt vector rapidly, so as to increase the performance of the computer system by entering the interrupt service routine more rapidly without losing the flexibility which having the interrupt vector allows.

SUMMARY OF THE INVENTION

The problems outlined above are in large part solved by an interrupt polling unit included within a bus interface unit of a microprocessor. The interrupt polling unit causes an interrupt acknowledge bus transaction to occur upon the occurrence of an internal event. If an interrupt controller receiving the interrupt acknowledge bus transaction returns an interrupt vector indicative of an interrupt service routine, then the microprocessor executes the interrupt service routine. Advantageously, the number of interrupt acknowledge bus transactions associated with the interrupt is reduced from two to one. The bus clock cycles saved are available for other transactions. Additionally, the latency from an interrupt being requested to the execution of the interrupt service routine is shortened with respect to that previously achievable. The latency reduction is achieved by performing one interrupt acknowledge bus transaction instead of two. By freeing bus clock cycles for other uses and speeding the execution of interrupt service routines, the present microprocessor may enjoy enhanced performance with respect to previous microprocessors. A computer system employing the microprocessor may enjoy similar enhanced performance.

In one embodiment, the interrupt polling unit causes an interrupt acknowledge bus transaction to occur upon the execution of a task switch by the microprocessor. Because a context save has already been performed due to the task switch, a low latency interrupt service may be performed. No context save is necessary. Instead, the original destination of the task switch is saved and the interrupt service routine is executed. Upon completion of the interrupt service routine, the context associated with the original destination is restored and the original destination is executed. Advantageously, an interrupt is serviced in the midst of a task switch which is already occurring. Fewer clock cycles may be used to perform interrupt service routine. These clock cycles may be allocated to other purposes, increasing potential throughput of the microprocessor.

Broadly speaking, the present invention contemplates a microprocessor comprising a bus interface unit and an instruction cache coupled thereto. The bus interface unit includes an interrupt polling unit coupled to a control unit. The interrupt polling unit is configured to generate a first signal indicative of a request to perform an interrupt acknowledge bus transaction when the microprocessor is performing a task switch. Coupled to receive the first signal and further coupled to a bus, the control unit is configured to effect bus transactions upon the bus including interrupt acknowledge bus transactions. The control unit is configured to effect the interrupt acknowledge bus transaction independent of receiving an interrupt signal upon the bus if the first signal is asserted. The instruction cache is configured to store instructions transferred from a main memory coupled to the microprocessor, and the bus interface unit is configured to transfer the instructions to the instruction cache.

The present invention further contemplates a computer system comprising a bus, a microprocessor, and an interrupt controller. Both the interrupt controller and the microprocessor are coupled to the bus. The interrupt controller is configured to convey an interrupt signal upon the bus indicative of a request to interrupt the microprocessor. In response, the microprocessor is configured to convey an interrupt acknowledge bus transaction upon the bus upon receipt of the interrupt signal. Furthermore, the microprocessor is configured to convey the interrupt acknowledge bus transaction upon the bus independent of receiving the interrupt signal. The interrupt acknowledge transaction is conveyed during a task switch by the microprocessor.

The present invention still further contemplates a bus interface unit comprising an interrupt polling unit coupled to a control unit. The interrupt polling unit is configured to generate a first signal indicative of a request to perform an interrupt acknowledge bus transaction when the microprocessor is performing a task switch. Coupled to receive the first signal and coupled to a bus, the control unit is configured to effect bus transactions upon the bus including interrupt acknowledge bus transactions. The control unit is configured to effect the interrupt acknowledge bus transaction independent of receiving an interrupt signal upon the bus if the first signal is asserted.

BRIEF DESCRIPTION OF THE DRAWINGS

Other objects and advantages of the invention will become apparent upon reading the following detailed description and upon reference to the accompanying drawings in which.

Figure 1:
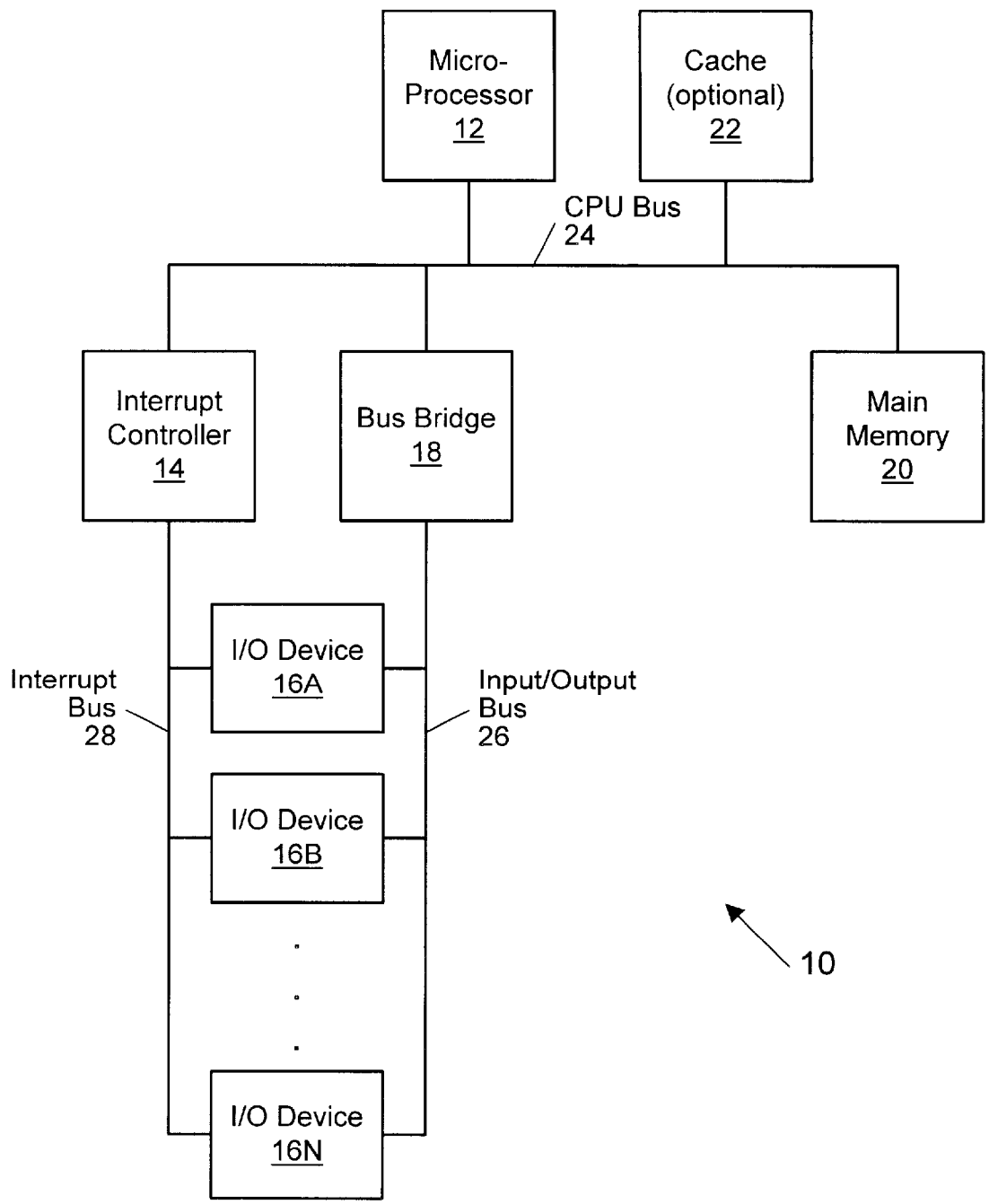
FIG. 1 is a block diagram of a computer system including a microprocessor according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a computer system 10 including a microprocessor 12, an interrupt controller 14, a plurality of input/output (I/O) devices 16A–16N (referred to collectively as I/O devices 16), a bus bridge 18, a main memory 20, and a cache 22 is shown. Microprocessor 12, interrupt controller 14, bus bridge 18, main memory 20, and cache 22 are coupled to a CPU bus 24 which effects high speed, high bandwidth communication between the connected devices. Lower speed, lower bandwidth communication is provided for I/O devices 16 via input/output bus 26. I/O devices 16 are coupled to interrupt controller 14 via an interrupt bus 28.

Microprocessor 12 includes hardware configured to perform an interrupt acknowledge bus transaction when microprocessor 12 is in the state of performing a task switch, either in hardware or in software. The interrupt acknowledge bus transaction is performed independent of an interrupt signal conveyed upon CPU bus 24 to microprocessor 12. Interrupt controller 14 is configured to provide an interrupt vector during such a bus transaction. If no interrupts are requested by I/O devices 16 when the interrupt acknowledge bus transaction occurs, then an interrupt vector indicative of no interrupt is returned. If one or more interrupt requests are active when the interrupt acknowledge bus transaction occurs, then interrupt controller 14 returns the interrupt vector associated with the highest priority interrupt which is active in computer system 10. This method of speculatively performing an interrupt acknowledge bus transaction when no interrupt is active upon CPU bus 24 is referred to herein as polling interrupt controller 14. Utilizing this method, computer system 10 effectively prefetches the interrupt service routine before the interrupt is actually signalled. The interrupt will not need to be signalled. Instead, the return of a valid interrupt vector causes the interrupt to occur. Bus clock cycles are advantageously saved by reducing the number of interrupt acknowledge bus transactions from two to one.

Interrupt bus 28 includes at least one interrupt conductor per I/O device 16A–16N. An interrupt request signal conveyed on the associated interrupt conductor is indicative of a request for interrupt of microprocessor 12 by the associated I/O device 16A–16N. Interrupt controller 14 is configured to receive the interrupt request signals and to convey an interrupt signal to microprocessor 12 upon CPU bus 24 in response to the interrupt request signals. In one embodiment, interrupt controller 14 is similar to an 8259A interrupt controller used in IBM compatible personal computer systems. In another embodiment, interrupt controller 14 includes multiple interrupt controllers similar to the 8259A cascaded to allow a larger number of I/O devices 16 to be connected. Interrupt controller 14 is programmable, and may be enabled to assert the interrupt signal individually for each interrupt request signal. In other words, interrupt controller 14 may be enabled to assert the interrupt signal if the interrupt request signal from I/O device 16A is asserted but not if the interrupt request signal from I/O device 16B is asserted (or vice-versa). In another embodiment, interrupt controller 14 may be programmed with a priority scheme for the interrupt request signals. The priority scheme is devised such that, if multiple interrupt request lines are asserted concurrently: the highest priority interrupt request is serviced first; followed by the next highest priority interrupt request; etc.

Interrupt controller 14 provides the interrupt vector which identifies the location of the interrupt service routine associated with the interrupting I/O device 16A–16N. The interrupt vector is transferred across CPU bus 24 after microprocessor 12 acknowledges receipt of the interrupt signal, or in response to the aforementioned polling. In one embodiment, microprocessor 12 issues an interrupt acknowledge transaction on CPU bus 24 when acknowledging the interrupt signal, and then issues a second interrupt acknowledge transaction to collect the interrupt vector. Other transactions upon CPU bus 24 are used to transfer data among devices coupled to CPU bus 24. An exemplary bus implementing such an interrupt acknowledge transaction may be found within the publication entitled: "16-bit and 32-bit Microprocessors Architecture, Software and Interfacing Techniques" by Singh, et al, Prentice Hall, Englewood Cliffs, N.J., 1991. This publication is incorporated herein by reference in its entirety.

Bus bridge 18 is provided to assist in communications (other than interrupt requests) between I/O devices 16 and devices coupled to CPU bus 24. I/O devices 16 typically require longer bus clock cycles than microprocessor 12 and other devices coupled to CPU bus 24. Therefore, bus bridge 18 provides a buffer between CPU bus 24 and input/output bus 26. Additionally, bus bridge 18 translates transactions from one bus protocol to another. In one embodiment, input/output bus 26 is an Enhanced Industry Standard Architecture (EISA) bus and bus bridge 18 translates from the CPU bus protocol to the EISA bus protocol. In another embodiment, input/output bus 26 is a Peripheral Component Interconnect (PCI) bus and bus bridge 18 translates from the CPU bus protocol to the PCI bus protocol. It is noted that many variations of CPU bus protocols exist. Microprocessor 12 may employ any suitable bus protocol.

I/O devices 16 provide an interface between computer system 10 and other devices external to the computer system. Exemplary I/O devices include a modem, a serial or parallel port, a sound card, etc. I/O devices 16 may also be referred to as peripheral devices. Main memory 20 stores data and instructions for use by microprocessor 12. Cache 22 is a small, high speed memory for temporarily storing data and instructions from main memory 20. If microprocessor 12 requests an address from main memory 20 and cache 22 is storing data associated with the requested address, then cache 22 provides the data. Cache 22 is an optional component, computer system 10 is fully functional without it. However, cache 22 may improve the performance of computer system 10. It is noted that cache 22 may also be inserted between microprocessor 12 and CPU bus 24 in other embodiments.

A second embodiment of computer system 10 is contemplated in which I/O devices 16 are coupled to CPU bus 24. Interrupt controller 14 and bus bridge 18 are not included in this embodiment. Instead, each I/O device 16 individually responds to interrupt acknowledge bus transactions in a manner similar to interrupt controller 14. Additionally, I/O devices 16 may be coupled as shown in FIG. 1 but may provide interrupt vectors through bus bridge 18.

It is noted that, although computer system 10 includes one microprocessor as shown in FIG. 1, other embodiments of computer system 10 including multiple processors are possible. Such embodiments are contemplated. It is further noted that, although FIG. 1 shows interrupt controller 14 coupled to CPU bus 24, interrupt controller 14 may in fact be coupled to I/O bus 26 or another I/O bus. When interrupt controller 14 is configured in this manner, interrupt acknowledge bus transactions are conveyed to the interrupt controller through one or more bus bridges similar to bus bridge 18. Often, when interrupt controller 14 is not coupled to CPU bus 24, interrupt controller 14 is still coupled directly to an interrupt conductor upon microprocessor 12 in order to convey the aforementioned interrupt signal.

Figure 2:
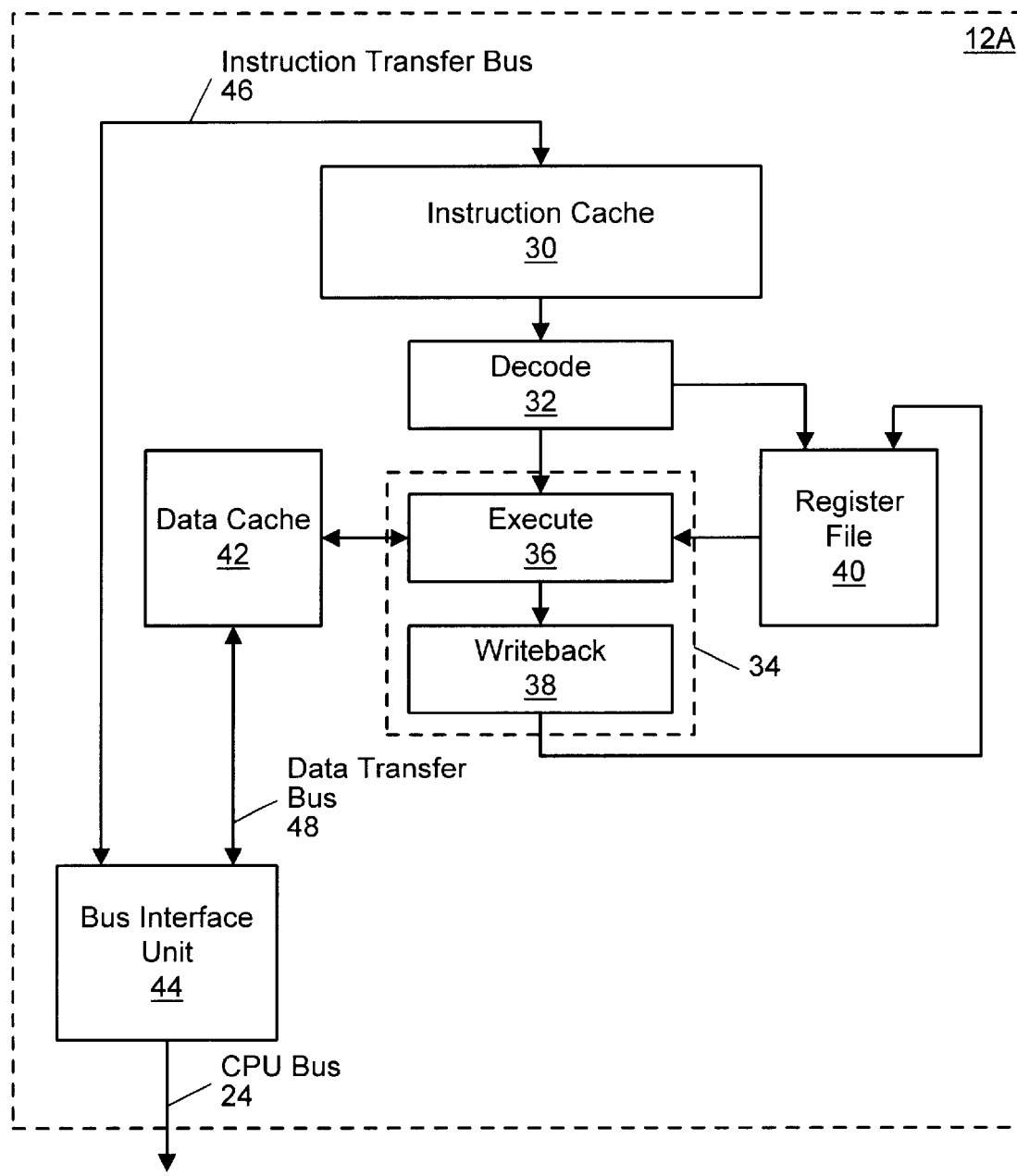
FIG. 2 is a block diagram of one embodiment of the microprocessor shown in FIG. 1, including a bus interface unit according to the present invention.

Turning now to FIG. 2, a first embodiment 12A of the microprocessor 12 (shown in FIG. 1) is shown in block diagram form. Microprocessor 12A includes an instruction cache 30 coupled to a decode unit 32 which is in turn coupled to an execution unit 34. Execution unit 34 includes an execute stage 36 and a writeback stage 38. A register file 40 is coupled to decode unit 32, execute stage 36, and writeback stage 38. Microprocessor 12A also includes a data cache 42 coupled between execute stage 36 and a bus interface unit 44. Bus interface unit 44 is additionally coupled to instruction cache 30 and CPU bus 24.

Generally speaking, bus interface unit 44 performs an interrupt acknowledge bus transaction according to an interrupt polling unit included within bus interface unit 44. The interrupt acknowledge bus transaction is performed independent of receiving an interrupt signal upon CPU bus 24. Instead, the interrupt acknowledge bus transaction is performed according to criteria determined by the interrupt polling unit. In one embodiment, the interrupt polling unit is configured to cause an interrupt acknowledge bus transaction when microprocessor 12 has performed a context save due to a task switch. The task being switched to in this case is not an interrupt service routine, but is another task being executed by microprocessor 12. Since the context save has already been performed, a low latency interrupt handling response may be generated by polling for an interrupt during a task switch.

If the interrupt vector returned as a result of the interrupt acknowledge bus transaction indicates that no interrupt requests are pending, then the interrupt poll is complete and microprocessor 12A continues unimpeded. However, if the interrupt vector returned indicates that an interrupt request is pending, then microprocessor 12A begins an interrupt sequence. Bus interface unit 44 informs instruction cache 30 that an interrupt has been signalled. Advantageously, the context save has already been performed and the interrupt routine may be entered more quickly. It is noted that microprocessor 12A is configured to save the original destination of the task switch when an interrupt sequence is performed according to the interrupt poll. When the interrupt service routine completes, the context of the original destination of the task switch is restored to microprocessor 12A and the original destination begins execution.

It is noted that in one embodiment, bus interface unit 44 retains the interrupt response functionality of receiving an interrupt signal, broadcasting an interrupt acknowledge bus transaction upon CPU bus 24, and broadcasting a separate interrupt acknowledge bus transaction upon CPU bus 24 to collect the interrupt vector. If an interrupt is signalled upon CPU bus 24, then the interrupt response functionality performs the typical interrupt handling functions.

When the interrupt signal is received in a state indicative of a request for interrupt, bus interface unit 44 conveys a signal indicative of interrupt to instruction cache 30. Logic within instruction cache 30 discards instructions currently being fetched and awaits the address of the interrupt service routine. Bus interface unit 44 reads the interrupt vector from interrupt controller 14 and performs the appropriate translation of the interrupt vector into an interrupt address. For example, in the x86 architecture the interrupt vector is used as an index into an interrupt descriptor table which provides protection information indicative of the privilege level and allowable memory access of the interrupt service routine as well as the interrupt service routine address. More information regarding the x86 interrupt structure may be found in the publication entitled: "PC Magazine Programmer's Technical Reference: The Processor and Coprocessor" by Robert L. Hummel, Ziff-Davis Press, Emeryville, Calif., 1992. This publication is incorporated herein by reference in its entirety. Once instruction cache 30 receives the address of the interrupt service routine, code fetch and instruction execution begins at that address.

In addition to performing interrupt polling and interrupt handling functions, bus interface unit 44 effects communication between microprocessor 12A and other devices coupled to CPU bus 24. For example, instruction code fetches which miss in instruction cache 30 are transferred from main memory 20 (shown in FIG. 1) to instruction cache 30 through bus interface unit 44. An instruction transfer bus 46 coupled between instruction cache 30 and bus interface unit 44 is employed to communicate the instruction code addresses to bus interface unit 44, as well as to communicate the fetched instructions to instruction cache 30. Additionally, data memory accesses which miss data cache 42 are transferred from main memory 20 to data cache 42. A data transfer bus 48 coupled between data cache 42 and bus interface unit 44 facilitates the data transfers. Data cache 42 may store modified data which must be written back to main memory 20, the transfer of which is also effected by bus interface unit 44.

Instruction cache 30 is a high speed cache memory capable of storing and retrieving instruction code. It is noted that instruction cache 30 may be configured as a set-associative or direct-mapped cache. Instructions fetched from instruction cache 30 are transferred to decode unit 32, which decodes the instruction to determine the operands used by the instruction as well as to bit-encode the instruction for execution unit 34. Decode unit 32 fetches register operands from register file 40 such that the values will be transferred to execution unit 34. In this manner, execution unit 34 receives its register operands during the same clock cycle that it receives its instruction.

Execution unit 34 includes execute stage 36 and writeback stage 38. Execute stage 36 executes the instruction provided by decode unit 32, producing a result. If the instruction utilizes a memory operand, the memory operand is transferred from data cache 42 prior to execution of the instruction. Writeback stage 38 stores the result generated by execute stage 36 into a destination specified by the instruction. The destination may be within register file 40 or data cache 42, in one embodiment.

Register file 40 is configured to store register operands for use by execution unit 34. In one embodiment, register file 40 stores the x86 register set which includes the EAX, EBX, ECX, EDX, EBP, ESI, EDI and ESP registers. Additionally, register file 40 may store the segment registers of the x86 architecture, as well as other miscellaneous registers.

Data cache 42 is a high speed cache memory configured to store data bytes being manipulated by microprocessor 12A. It is understood that data cache 42 may be configured in a set associative or direct-mapped configuration.

Figure 3:
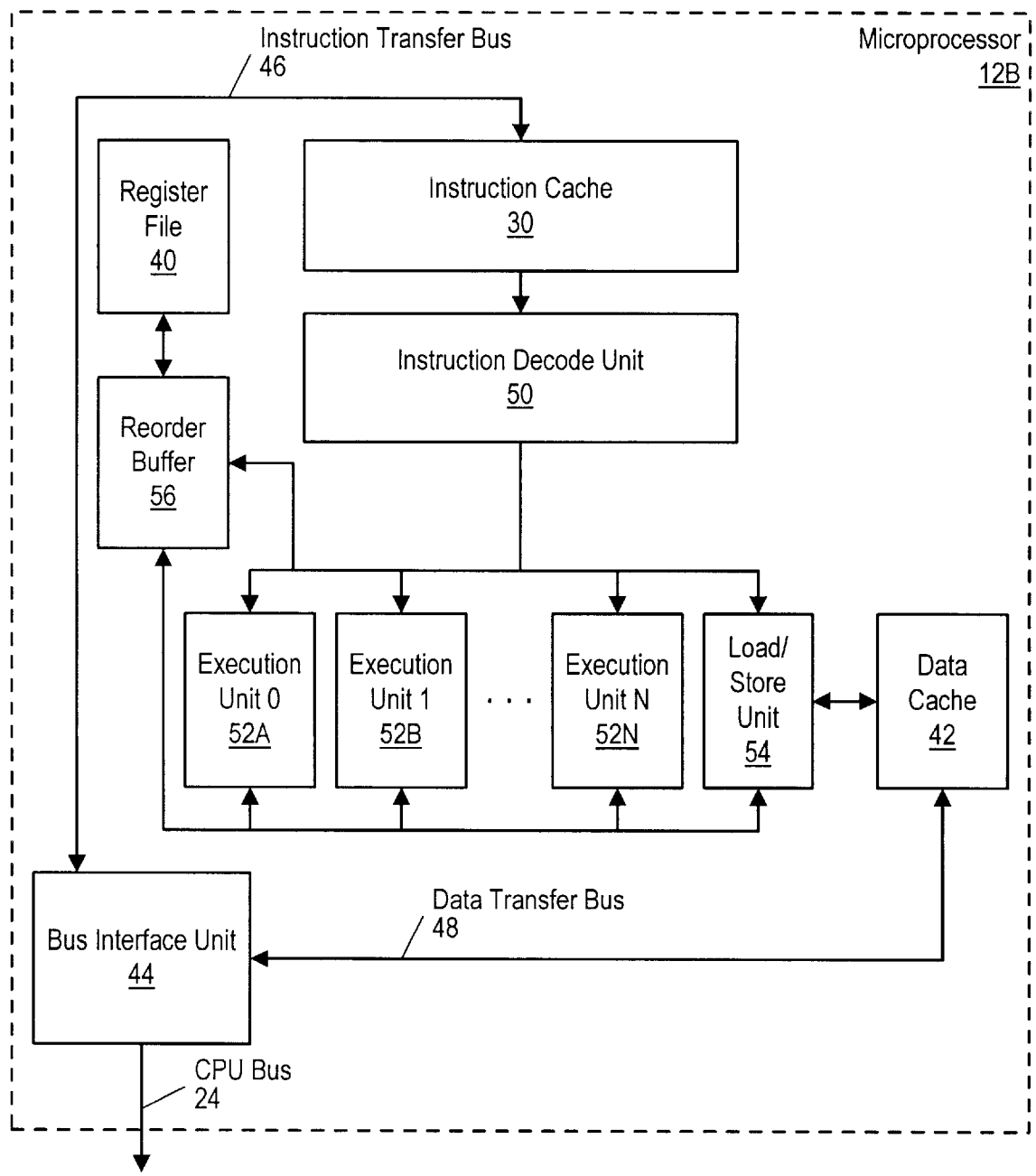
FIG. 3 is a block diagram of another embodiment of the microprocessor shown in FIG. 1, including the bus interface unit according to the present invention.

Turning now to FIG. 3, a second embodiment of microprocessor 12 (microprocessor 12B) is shown as a block diagram. Similar to microprocessor 12A, microprocessor 12B includes a bus interface unit 44, an instruction cache 30, a data cache 42, and a register file 40. Bus interface unit 44 is coupled to instruction cache 30 via instruction transfer bus 46. Similarly, bus interface unit 44 is coupled to data cache 42 via data transfer bus 48. Additionally, microprocessor 12B includes a multiple instruction decode unit 50 coupled between instruction cache 30 and a plurality of execution units 52A–52N (referred to collectively as execution units 52). A load/store unit 54 is included to interface between execution units 52 and data cache 42. Finally, a reorder buffer 56 is coupled to decode unit 50, execution units 52, and load/store unit 54.

Microprocessor 12B is a superscalar microprocessor configured to execute multiple instructions during a clock cycle. Decode unit 50 therefore decodes multiple instructions during a single clock cycle and dispatches the instructions to execution units 52. Additionally, a storage location within reorder buffer 56 is allocated for each decoded and dispatched instruction. The storage locations are allocated to instructions in the order they occur within the task, so that the results created by executing the instructions may be recorded in register file 40 or data cache 42 in program order. By including reorder buffer 56, instructions may be speculatively executed out of order by execution units 52. In one embodiment, execution units 52 are asymmetrical execution units. Each execution unit 52A–52N is configured to execute a particular subset of microprocessor 12B's instruction set. The particular subset of the instruction set which execution unit 52A is configured to execute may differ from the particular subset of the instruction set which execution unit 52B is configured to execute. Similarly, other execution units may have differing particular subsets of the instruction set. In another embodiment, execution units 52 are symmetrical execution units. Each execution unit 52A–52N is configured to execute a similar subset of the instruction set.

Load/store unit 54 is configured to execute load and store (i.e. read and write) memory transactions to data cache 42 according to the task being execution by microprocessor 12B. Additionally, load/store unit 54 may be configured to detect memory dependencies between load and store instructions.

Reorder buffer 56 provides dependency checking and result forwarding such that each instruction receives the correct operand values prior to that instruction being executed. Reorder buffer 56 includes temporary storage for the result of each instruction until that instruction is retired. An instruction is retired by storing its result into register file 40 or data cache 42 (if needed) and deleting the instruction from reorder buffer 56. If an instruction decoded by decode unit 50 requires the result of an instruction which has not yet executed, then a tag indicative of which reorder buffer storage location will store that result is forwarded to the execution unit receiving the instruction in lieu of the operand value. The execution unit then monitors the results produced by the execution units for the provided tag. When the result is generated, the execution unit generating the result conveys the tag along with the result to reorder buffer 56. The execution unit awaiting the tag captures the result and stores it along with the instruction for later execution. Monitoring for the register tag and capturing the associated result is referred to as "result forwarding". It is noted that any suitable reorder buffer configuration may be employed by microprocessor 12B.

Execution units 52 and load/store unit 54 may employ reservation stations to store instructions dispatched to the unit. An instruction remains in the reservation station until all of its operands are available, and then is executed by the associated execution unit. It is noted that load/store unit 54 may perform store memory accesses in program order. Reorder buffer 56 conveys a value to load/store unit 54 indicative of which store memory accesses may be performed. The store memory accesses are performed to data cache 42 or, in the case of a miss in data cache 42, to main memory 20 through bus interface unit 44. It is noted that the above mentioned reservation stations may be configured outside of the associated execution unit.

It is noted that, when an interrupt is signalled to microprocessor 12B, results stored in reorder buffer 56 may be discarded. The instruction most recently retired defines the context to be returned to. It is further noted that instruction cache 30 may employ branch prediction to further increase the performance of microprocessor 12B. Instruction cache 30 may employ any branch prediction mechanism.

Additional information regarding microprocessors may be found within the commonly assigned, co-pending patent application entitled "High Performance Superscalar Microprocessor", Ser. No. 08/146,382, filed Oct. 29, 1993 by Witt, et al. Further information regarding microprocessors may be found within the commonly assigned, co-pending patent application entitled "Superscalar Microprocessor Including a High Performance Instruction Alignment Unit", Ser. No. 08/377843, filed Jan. 25, 1995 by Witt, et al. The disclosures of these patent applications are incorporated herein by reference in their entirety.

Figure 4:
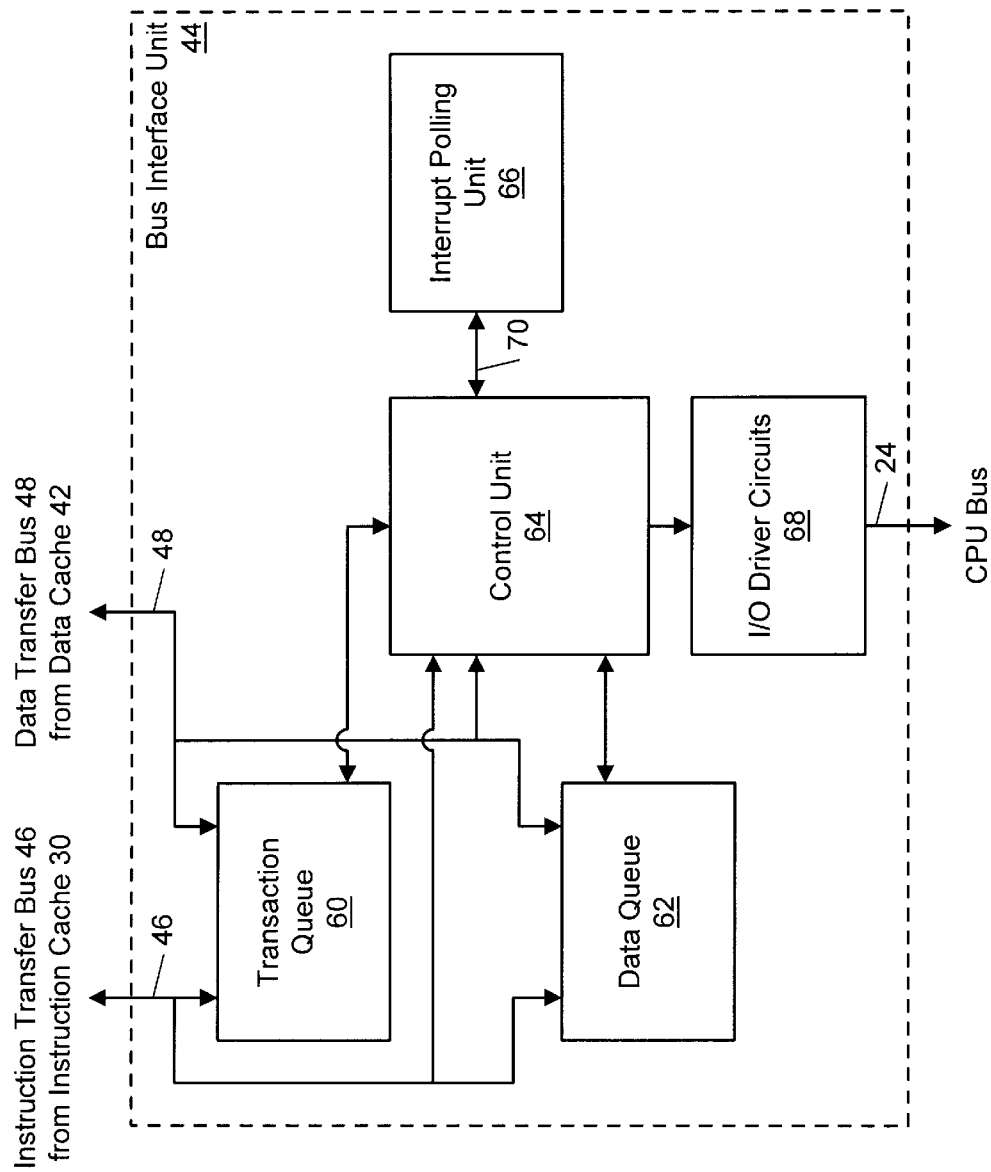
FIG. 4 is a block diagram of the bus interface unit shown in FIGS. 2 and 3, including an interrupt polling unit according to the present invention.

Turning next to FIG. 4, a block diagram of one embodiment of bus interface unit 44 (shown in FIGS. 2 and 3) is shown. Bus interface unit 44 is suitable for use in both microprocessors 12A and 12B, as well as in other embodiments of microprocessor 12. Bus interface unit 44 includes a transaction queue 60, a data queue 62, a control unit 64, an interrupt polling unit 66, and I/O driver circuits 68. Instruction transfer bus 46 and data transfer bus 48 are coupled to transaction queue 60, data queue 62, and control unit 64. Control unit 64 is coupled to transaction queue 60, data queue 62, I/O driver circuits 68, and interrupt polling unit 66.

Control unit 64 receives a bus 70 from interrupt polling unit 66, including a perform interrupt acknowledge signal indicative, when asserted, of a request by interrupt polling unit 66 to perform an interrupt acknowledge bus transaction upon CPU bus 24. As used herein, a signal is "asserted" if it conveys a value indicative of a particular piece of information. Conversely, a signal is "deasserted" if it conveys a value indicative of a lack of a particular piece of information. For example, the perform interrupt acknowledge signal is asserted if interrupt polling unit 66 is requesting that control unit 64 perform an interrupt acknowledge bus transaction. If interrupt polling unit 66 is not requesting that control unit 64 perform an interrupt acknowledge bus transaction, then the perform interrupt acknowledge signal is deasserted. A signal may be defined to be asserted when it conveys a logical zero value or, conversely, when it conveys a logical one value.

Upon receipt of an asserted perform interrupt acknowledge signal from interrupt polling unit 66, control unit 64 performs an interrupt acknowledge bus transaction upon CPU bus 24. If the interrupt vector transferred to bus interface unit 44 is indicative of a valid interrupt, then control unit 64 begins processing the interrupt. If the interrupt vector indicates that no interrupt requests are pending, then the interrupt poll is complete.

In addition to performing interrupt acknowledge bus transactions at the request of interrupt polling unit 66, control unit 64 performs other bus transactions required by instruction cache 30 and data cache 42. Bus transactions are effected through I/O driver circuits 68. CPU bus 24 is typically a large capacitive load, as compared to circuits internal to microprocessor 12. I/O driver circuits 68 are configured to charge and discharge this larger load. Therefore, circuits internal to microprocessor 12 may be configured to drive the relatively smaller loads characterized by internal circuitry. Additionally, microprocessor 12 may be exposed to higher voltages than circuits internal to microprocessor 12 are capable of withstanding. I/O driver circuits 68 therefore provide a buffer between these higher voltages and the circuits within control unit 64.

Bus transactions requested by instruction cache 30 and data cache 42 are stored in transaction queue 60. Control unit 64 performs the transactions in transaction queue 60 according to a priority scheme designed to maximize the performance of microprocessor 12. In one embodiment, for example, read transactions are prioritized ahead of write transactions (as long as the transactions are to dissimilar addresses). Microprocessor 12 may require the data associated with a read transaction, while write transactions are an update to memory and often are not immediately needed by microprocessor 12. Data associated with transactions in transaction queue 60 is temporarily stored in data queue 62. Data for read transactions is then later transferred to instruction cache 30 or data cache 42 (depending on the origin of the transaction). Data for write transactions is transferred to memory as a part of the associated write transaction.

Figure 5:
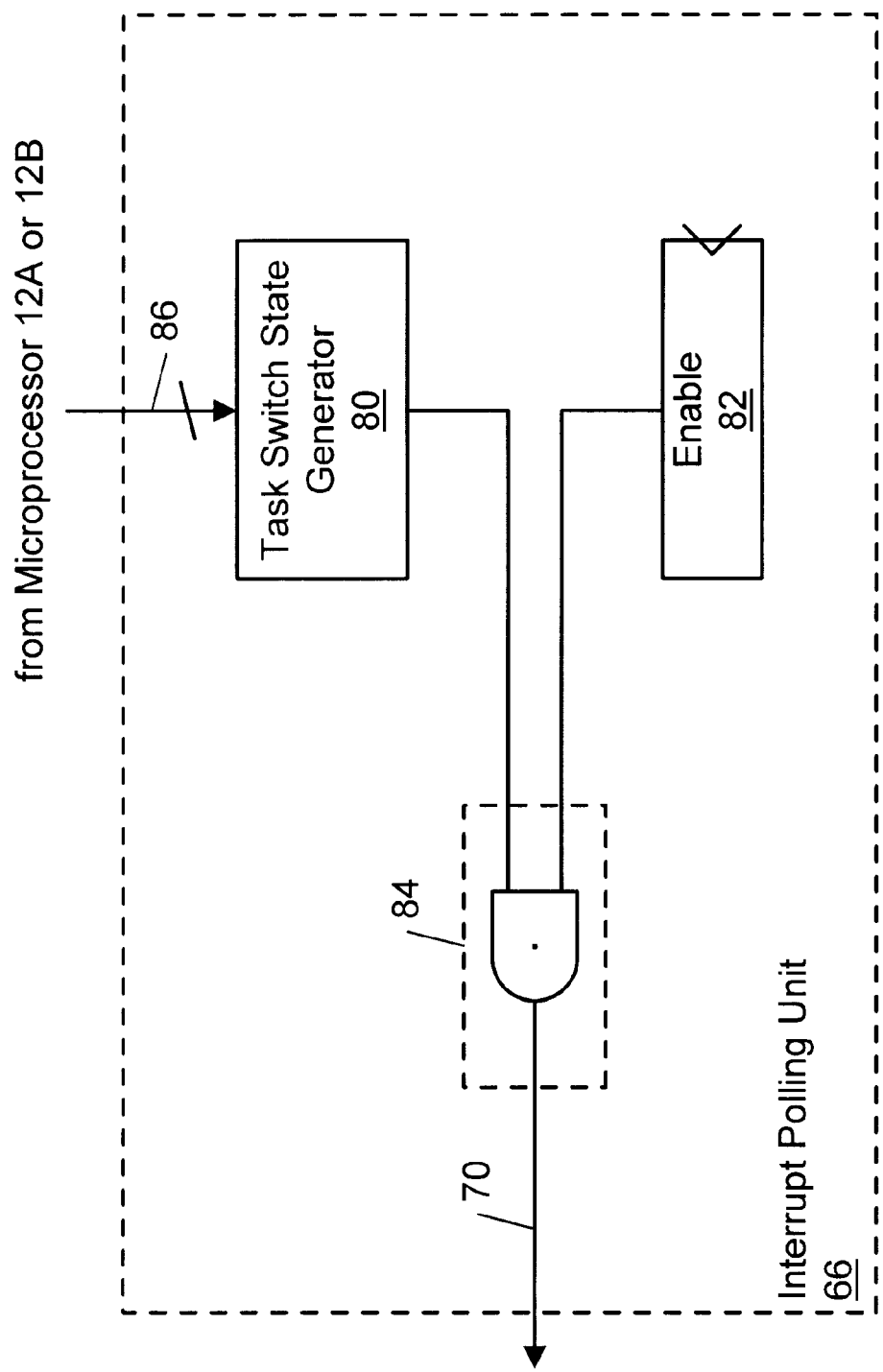
FIG. 5 is a logic diagram of the interrupt polling unit shown in FIG. 4 according to one embodiment of the present invention.

Turning next to FIG. 5, an exemplary embodiment of interrupt polling unit 66 is shown as a logic diagram. A task switch state generation logic block 80 is included, as well as an enable register 82 and a combinatorial logic block 84. Task switch state generation logic block 80 is configured to determine if microprocessor 12 is in the process of performing a task switch. In one embodiment, a bus 86 of internal signals is coupled to task switch generation logic block 80. The internal signals, when conveying a particular set of values or a particular sequence of values through multiple clock cycles, are indicative of microprocessor 12 performing a task switch. For example, signals indicative of a context save operation being performed may be conveyed upon bus 86.

Logic block 80 may include combinatorial logic gates and storage locations (such as registers) which are configured to assemble the task switch state of microprocessor 12. It is noted that operating systems may perform a task switch entirely in software, such that microprocessor 12 does not transition to a task switch state. In one embodiment, logic block 80 includes a register which may be written via execution of a specific software instruction. The operating system may utilize this instruction within its tasks which perform the task switch. In this manner, logic block 80 may detect a task switch performed by a task or set of tasks as opposed to hardware included within microprocessor 12.

Enable register 82 stores a value indicative of enablement of disablement of interrupt polling unit 66. Enable register 82 may be written to via execution of a specific instruction by microprocessor 12. Advantageously, the interrupt polling unit may be disabled from performing interrupt polling if desired.

Combinatorial logic block 84 is configured to combine the enable value stored in enable register 82 and the result of task switch state generation logic block 80 to form the perform interrupt acknowledge signal upon bus 70. Combinatorial logic block 84 includes at least one logic gate configured to assert the perform interrupt acknowledge signal if task switch state generation logic block 80 indicates that microprocessor 12 is in a state of performing a task switch and enable register 82 stores a value indicative of enablement of interrupt polling unit 66. In one specific embodiment, combinatorial logic block 84 comprises an AND gate receiving a signal from task switch state generation logic block 80 and a signal from enable register 82. Other embodiments of combinatorial logic block 84, enable register 82, and task switch state generation logic block 80 are contemplated.

In accordance with the above disclosure, a microprocessor configured to periodically issue an interrupt acknowledge bus transaction is described. The interrupt acknowledge bus transaction is issued independent of an interrupt signal to the microprocessor. Instead, the interrupt acknowledge bus transaction is performed when the microprocessor is performing a task switch. If an interrupt controller or interrupting device receives the interrupt acknowledge bus transaction and has a pending interrupt, then the device returns an interrupt vector indicative of the requested interrupt service routine. Advantageously, an interrupt service routine may be entered earlier then was previously achievable by prefetching the interrupt and by executing the interrupt service routine when a task switch has already begun for reasons other than an interrupt. Performance of the microprocessor may be increased, particularly in computer systems which perform interrupts often.

Numerous variations and modifications will become apparent to those skilled in the art once the above disclosure is fully appreciated. It is intended that the following claims be interpreted to embrace all such variations and modifications.

What is claimed is:

1. A microprocessor, comprising:
   a bus interface unit, including:
      an interrupt polling unit configured to generate a first signal indicative of a request to perform an interrupt acknowledge bus transaction to read an interrupt vector, wherein said interrupt polling unit is configured to generate said first signal in response to said microprocessor performing a non-interrupt invoked task switch; and
      a control unit coupled to receive said first signal and coupled to a bus, wherein said control unit is configured to effectuate bus transactions upon said bus including interrupt acknowledge bus transactions, and wherein said control unit is configured to effectuate said interrupt acknowledge bus transaction independent from receiving an interrupt signal upon said bus if said first signal is asserted; and
   an instruction cache configured to store instructions transferred from a main memory coupled to said microprocessor, wherein said bus interface unit is configured to transfer said instructions to said instruction cache.

2. The microprocessor as recited in claim 1 wherein said control unit is configured to receive an interrupt vector during said interrupt acknowledge bus transaction.

3. The microprocessor as recited in claim 2 wherein said control unit is configured to direct said instruction cache to fetch an interrupt service routine identified by said interrupt vector.

4. The microprocessor as recited in claim 2 wherein said interrupt vector includes an interrupt vector value indicative of zero interrupt requests.

5. The microprocessor as recited in claim 4 wherein said control unit is configured to allow said instruction cache to continue fetching instructions from an address other than the address associated with said interrupt vector if said interrupt vector indicates zero interrupt requests.

6. The microprocessor as recited in claim 1 wherein said interrupt polling unit comprises:
   a task switch state generation logic block configured to detect a time period in which said microprocessor is performing a task switch, wherein said task switch state generation logic block is configured to convey a task switch signal indicative, when asserted, of said time period; and
   a combinatorial logic block coupled to receive said task switch signal and to convey said first signal according to said task switch signal.

7. The microprocessor as recited in claim 6 wherein said interrupt polling unit further comprises a polling enable register configured to store an enable value indicative of enablement and disablement of said interrupt polling unit.

8. The microprocessor as recited in claim 7 wherein said combinatorial logic block is configured to assert said first signal if said enable value indicates enablement and said task switch signal is asserted.

9. The microprocessor as recited in claim 7 wherein said combinatorial logic block is configured to deassert said first signal if said enable value indicates disablement.

10. The microprocessor as recited in claim 1 wherein said microprocessor is configured to store an original destination of said task switch if said interrupt acknowledge bus transaction results in an interrupt.

11. The microprocessor as recited in claim 10 wherein said microprocessor is configured to restore a context associated with said original destination upon completion of an interrupt service routine associated with said interrupt.

12. A computer system, comprising:
   a bus;
   an interrupt controller coupled to said bus, wherein said interrupt controller is configured to assert an interrupt signal upon said bus indicative of a request to interrupt a microprocessor; and
   a microprocessor coupled to said bus, wherein said microprocessor is configured to effectuate an interrupt acknowledge bus transaction upon said bus upon receipt of said interrupt signal from said interrupt controller, and wherein said microprocessor is configured to effectuate said interrupt acknowledge bus transaction upon said bus independent from receiving said interrupt signal from said interrupt controller in response to a task switch performed by said microprocessor.

13. The computer system as recited in claim 12 further comprising a plurality of input/output devices coupled to said interrupt controller, wherein each of said plurality of input/output devices is configured to assert an interrupt request signal to said interrupt controller in order to interrupt said microprocessor.

14. The computer system as recited in claim 12 further comprising a main memory coupled to said CPU bus, wherein said main memory is configured to store instruction and data bytes for use by said microprocessor.

15. The computer system as recited in claim 12 wherein said microprocessor comprises:
   a bus interface unit, including:
      an interrupt polling unit configured to generate a first signal indicative of a request to perform an interrupt acknowledge bus transaction to read an interrupt vector, wherein said interrupt polling unit is configured to generate said first signal when said microprocessor is performing a non-interrupt invoked task switch; and
      a control unit coupled to receive said first signal and coupled to a bus, wherein said control unit is configured to effectuate bus transactions upon said bus including interrupt acknowledge bus transactions, and wherein said control unit is configured to effectuate said interrupt acknowledge bus transaction independent from receiving an interrupt signal upon said bus if said first signal is asserted; and
   an instruction cache configured to store instructions transferred from a main memory coupled to said microprocessor, wherein said bus interface unit is configured to transfer said instructions to said instruction cache.

16. The computer system as recited in claim 15 wherein said control unit is configured to receive an interrupt vector during said interrupt acknowledge bus transaction.

17. The computer system as recited in claim 16 wherein said control unit is configured to direct said instruction cache to fetch an interrupt service routine identified by said interrupt vector.

18. The computer system as recited in claim 16 wherein said interrupt vector includes an interrupt vector value indicative of zero interrupt requests.

19. A bus interface unit, comprising:
   an interrupt polling unit configured to generate a first signal indicative of a request to perform an interrupt acknowledge bus transaction to read an interrupt vector, wherein said interrupt polling unit is configured to generate said first signal when said microprocessor is performing a non-interrupt invoked task switch; and
   a control unit coupled to receive said first signal and coupled to a bus, wherein said control unit is configured to effectuate bus transactions upon said bus including interrupt acknowledge bus transactions, and wherein said control unit is configured to effectuate said interrupt acknowledge bus transaction independent from receiving an interrupt signal upon said bus if said first signal is asserted.

20. The bus interface unit as recited in claim 19 wherein said interrupt polling unit comprises:
   a task switch state generation logic block configured to detect a time period in which said microprocessor is performing a task switch, wherein said task switch state generation logic block is configured to convey a task switch signal indicative, when asserted, of said time period; and
   a combinatorial logic block coupled to receive said task switch signal and to convey said first signal according to said task switch signal.

21. The bus interface unit as recited in claim 20 wherein said interrupt polling unit further comprises a polling enable register configured to store an enable value indicative of enablement and disablement of said interrupt polling unit.

22. The bus interface unit as recited in claim 21 wherein said combinatorial logic block is configured to assert said first signal if said enable value indicates enablement and said task switch signal is asserted.

23. The bus interface unit as recited in claim 21 wherein said combinatorial logic block is configured to deassert said first signal if said enable value indicates disablement.

\* \* \* \* \*